No. 753,310.

Patented March 1, 1904.

UNITED STATES PATENT OFFICE.

WESTON A. PRICE, OF CLEVELAND, OHIO, ASSIGNOR TO THE ELECTRIC AND DENTAL SPECIALTY COMPANY, OF CLEVELAND, OHIO, A CORPORATION OF OHIO.

COMPOSITION OF MATTER.

SPECIFICATION forming part of Letters Patent No. 753,310, dated March 1, 1904.

Application filed February 26, 1903. Serial No. 145,264. (No specimens.)

*To all whom it may concern:*

Be it known that I, WESTON A. PRICE, a citizen of the United States, and a resident of Cleveland, county of Cuyahoga, and State of Ohio, have invented a new and useful Composition of Matter, of which the following is a specification, the principle of the invention being herein explained and the best mode in which I have contemplated applying that principle, so as to distinguish it from other inventions.

My invention relates to a new and useful composition of matter which shall be impervious to X-rays. I have found that such a composition of matter should have for its base a dense compact metallic constituent in order that the same may be opaque to X-rays, and with this base I incorporate a binder which will produce a resultant mixture that is glutinous and adhesive when hot and which will be flexible and tenacious when it is used. Many vegetable products serve the purpose of such a binder, and with them it is often advisable to mix a quantity of animal matter. Of the vegetable products that may be used, either unalloyed or mixed with a quantity of animal matter, the more desirable are raw exudations from plants or trees or products made from such raw exudations—as molasses, rubber, resins, turpentine, glycerin, syrups, &c.—and of the animal products that may be used the gelatins are characteristic.

I do not limit myself to any special composition of binder or to definite proportions of either the base or the constituents of the binder, but merely incorporate with a dense compact base a binder that will produce a resultant mixture of any or all of the characteristics mentioned, depending upon the purposes in hand.

The composition consists of a metallic compound of high molecular weight, preferably the oxid of a metal of high atomic weight, mixed with a binder that will produce the results noted. I have found that red lead is the metallic compound that will best suit the purpose, and with it I mix by agitation the constituents of the binder.

My preferred composition consists of red lead, glue, glycerin, molasses, and rubber, which I mix in the following proportions, by weight: red lead, ten parts; best glue, one part; glycerin, one part; molasses, one-half of one part, and rubber one-tenth of one part. When thoroughly agitated, the resultant composition can be rolled or molded into any desired shape or size for handling or shipping.

Other compounds of lead will serve well as the metallic base, also compounds of mercury. Compounds of zinc and iron can also be used, but are inferior to the lead and mercury compounds.

Said composition of matter is impervious to X-rays, is a non-conductor of electricity, is as flexible as rubber, whereby it can be easily made into gloves or other suitable articles for covering such bodies as it is desired should be protected from the rays, while at the same time it is very economical.

What I claim, and desire to secure by Letters Patent of the United States, is—

1. The herein-described composition of matter, consisting of a metallic compound of high molecular weight, and a binder composed of glue, glycerin, molasses and rubber, substantially as described.

2. The herein-described composition of matter, consisting of a metallic oxid, and a binder composed of glue, glycerin, molasses and rubber, substantially as described.

3. The herein-described composition of matter, consisting of red lead, and a binder composed of rubber, resin and turpentine, substantially as described.

4. The herein-described composition of matter, consisting of red lead, and a binder composed of resin, syrup, and rubber, substantially as described.

5. The herein-described composition of matter, consisting of red lead, and a binder composed of glue, glycerin, and molasses, substantially as described.

6. The herein-described composition of matter, consisting of red lead, and a binder composed of glycerin, molasses and rubber, substantially as described.

n-described composition of mat-
of red lead, and a binder com-
glycerin, molasses and rubber,
s described.
n-described composition of mat-
r of the following component
llowing proportions by weight:
parts; glue, one part; glycerin,
asses, one-half of one part; and
rubber, one-tenth of one part, substantially as described.

Signed by me this 25th day of February, 1903.

WESTON A. PRICE.

Attest:
G. W. SAYWELL,
A. E. MERKEL.